United States Patent
Schmitz et al.

(10) Patent No.: US 8,612,558 B2
(45) Date of Patent: Dec. 17, 2013

(54) AUTOCONFIGURED CONNECTION PATHS TO A TARGET DEVICE

(75) Inventors: Brian P. Schmitz, Garden City, ID (US); Scott A. White, Boise, ID (US); Phillip A. Mccoog, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 87 days.

(21) Appl. No.: 13/097,584

(22) Filed: Apr. 29, 2011

(65) Prior Publication Data

US 2012/0278452 A1 Nov. 1, 2012

(51) Int. Cl.
*G06F 15/177* (2006.01)
*G06F 15/16* (2006.01)

(52) U.S. Cl.
USPC .............................. 709/220; 709/228; 709/230

(58) Field of Classification Search
USPC .......................................... 709/220, 228, 230
See application file for complete search history.

(56) References Cited

U.S. PATENT DOCUMENTS

| | | | | |
|---|---|---|---|---|
| 5,703,929 | A * | 12/1997 | Schillaci et al. | 379/21 |
| 7,062,651 | B1 * | 6/2006 | Lapstun et al. | 713/168 |
| 7,805,610 | B2 * | 9/2010 | Lapstun et al. | 713/168 |
| 7,840,314 | B2 * | 11/2010 | Simon | 701/1 |
| 7,861,182 | B2 | 12/2010 | Liu | |
| 8,073,007 | B2 * | 12/2011 | Tremaine et al. | 370/466 |
| 2005/0122999 | A1 * | 6/2005 | Scherzer et al. | 370/480 |
| 2006/0135143 | A1 | 6/2006 | Suematsu | |
| 2007/0100507 | A1 * | 5/2007 | Simon | 701/1 |
| 2008/0246988 | A1 | 10/2008 | Ashton | |
| 2010/0106864 | A1 * | 4/2010 | Li et al. | 710/17 |
| 2011/0029692 | A1 * | 2/2011 | Chassot et al. | 710/8 |

FOREIGN PATENT DOCUMENTS

JP 2003318969 A 11/2003
JP 2010074375 A 4/2010

* cited by examiner

*Primary Examiner* — Kristie Shingles

(57) ABSTRACT

A connecting device discovers a first connection path to a target device and configures a first connection with the target device. The connecting device receives information about additional available connection paths from the target device via the first connection path. The connecting device automatically configures at least a second connection with the target device via an additional available connection path.

20 Claims, 4 Drawing Sheets

AUTOCONFIGURED CONNECTION PATHS TO A TARGET DEVICE

BACKGROUND

As electronic interconnectivity increases, multiple connection paths can exist between two computing devices. The configuration and selection these connection paths to the printer can significantly complicate the experience of the user. Conventionally, when configuring a printer, the user separately generates printer configurations for each of connection paths. When the user prints data to the printer, the user chooses one of the connection paths.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As interconnectivity between computing devices increases, multiple connection paths can exist between two computing devices. For example, a computing device may be connected to printer through any of a number of connection paths, In addition to a wired connection, the computing device and/or printer may have wireless capabilities such as Bluetooth or infrared transceivers, Wi-Fi, WiMax, GSM, PCS, or other wireless communication capabilities. Additionally, this connection hardware may be used to connect to a printer through a wide variety of networks. Consequently, there may be many different connection paths between the computing device and the printer.

Conventional installation of the printer on the computing device involves the user generating different printer configurations for each of the possible connection paths. When the user desires to print data on the printer the user is forced to evaluate which of the connection paths are most suitable and select the corresponding printer configuration. However, the user may not be aware which of the connections are available, most efficient, or cost effective in delivering the print data to the printer.

The illustrative systems and methods described herein facilitate the installation and connection process for printers and other devices. While printers are described herein as primary examples of target devices, other network connected devices could also function as target devices. In various embodiments, once a user has configured an initial connection to a target device (e.g., printer) using a first connection path, additional connections between the connecting device and the target device are automatically configured using different connection paths. As such, the user's efforts in configuring a single connection to a target device results in the establishment of multiple connection paths available to the user. As used herein, the term "connection path" refers to a possible communication channel between a computing device and a printer. The connection path may or may not be accessible at any given time or location.

Figure 1:
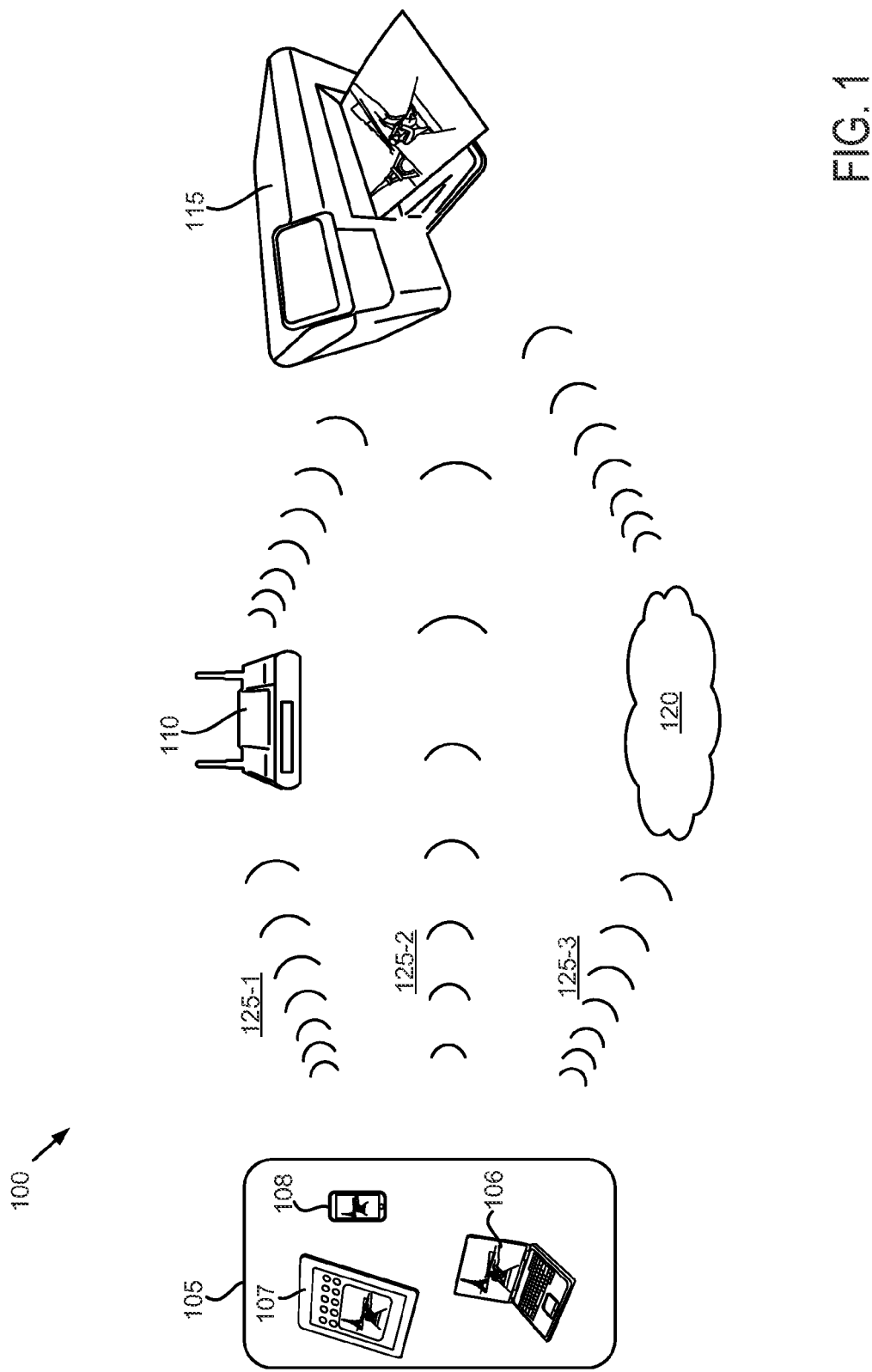
FIG. 1 is a block diagram illustrating a system according to various embodiments.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

As shown, network (100) includes multiple connection paths (125) between computing devices (105) and a printer (115). The computing devices (105) may include a wide variety of computing devices, including desktops, laptops (106), tablet computers (107), mobile devices (108) and other network enabled devices. One or more connection paths (125) to a printer (115) may be available to the computing devices (105). To make a viable connection between a computing device (105) and the printer (115), the computing device (105) is powered up and has the hardware/software capability to support the connection. If there are intermediate devices in the connection path, the intermediate devices are available to transfer the communications. The printer (115) is also powered up, connected to the appropriate connection path and ready to receive print data.

A first connection path (125-1) includes wireless communication between one of the computing devices (105) and passes through a wireless access point (110). The wireless access point (110) includes one or more radios that establish two-way communications with a wireless radio in the computing device. The wireless access point (110) may have a wired or wireless connection with the printer. In this example, the printer is wireless enabled and the wireless access point (110) connects to the printer using a wireless connection.

A second connection path (125-2) is a peer-to-peer wireless connection. The peer-to-peer connection (125-2) could made using a variety of technologies, including ad-hoc wireless connections, Wi-Fi, Wi-Fi direct, Universal Serial Bus (USB) wireless, Wi-Max, infrared, Near Field Communication (NFC) or other wireless connection technology. The peer-to-peer connection path (125-2) may have a number of advantages including the ability to directly connect to the printer (115) without having to authenticate on a network or pass through other intermediate devices. This can create a relatively simple and secure connection path. The peer-to-peer wireless connection path (125-2) could have several limitations, including a short transmission range and a relatively low connection speed.

A third connection path (125-3) is made through a cloud (120). As used in the specification and appended claims, the term "cloud" refers to networks and technology that support communication between non-analogous networks. When connecting through the cloud (120), the computing device (105) doesn't know the exact connection path to the printer (115), and vice versa. However, the connection is made using the cloud capabilities to connect and translate between whatever network connections are being used. In some embodiments, the computing devices (105) may send printing requests and data to a predetermined Universal Resource Locator (URL) or Internet Protocol (IP) address in the cloud (120). The printer (115) registers with the IP network so that communication and data sent to the predetermined URL or IP address is forwarded to the printer (115). In other embodiments, the computing devices (105) may send printing requests and data to an email address associated with the printer (115).

Figure 2:
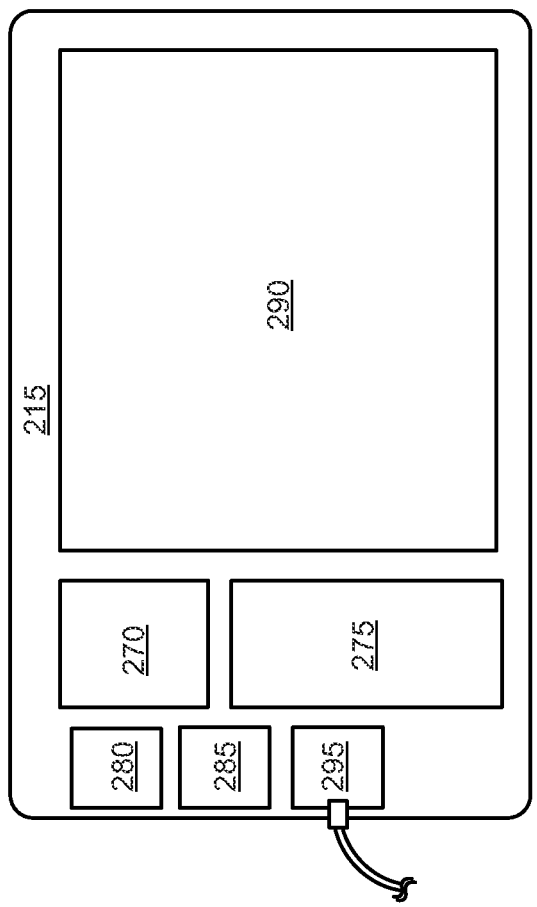
FIG. 2 is a block diagram illustrating various components in a connecting device and a target device according to various embodiments.
Figure 2:
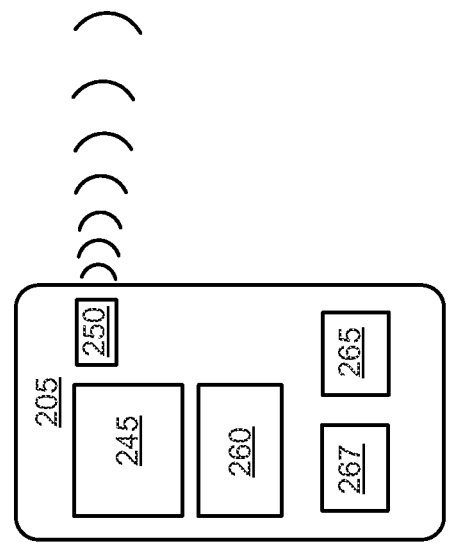

FIG. 2 is a block diagram illustrating various components within an illustrative connecting computing device (205) and target device (215). The connecting device (205) can be any computing device including a desktop, notebook, tablet computer, smart phone or other suitable network enabled device. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

The illustrative connecting device (205) and printer (215) have the capabilities to implement the methods discussed above. The discovery module (265) discovers connection paths to the printer (215). For example, the discovery module (265) might discover the printer (215) via Bonjour (available from Apple, Inc. of Cupertino, Calif.) or other suitable discovery protocol (e.g., multicast DNS, etc.).

The connection module (267) then configures an initial connection with the printer (215) using the communication module (250). The communication module (250) supports a variety of wireless or wired connections that enable network, peer-to-peer, and/or cloud connectivity. In various embodiments, connections are configured based on a printer identifier, authentication token and connection path information for the given connection path. The printer identifier can be a dynamic identifier such as, for example, an IP (Internet Protocol) address, or a semi-permanent identifier such as, for example, a MAC (media access control) address (the MAC address of a device may not be permanent because it can be changed, for example, by changing the network card of the device). In certain embodiments, the printer identifier is a unique fixed identifier permanently associated with the printer (215). Connection path information might include a SSID (Service Set Identifier) for a wireless LAN (Local Area Network), a URL or IP address for a cloud connection, etc. In certain direct connections (e.g., NFC), connection path information may be unnecessary. Printer identifiers, authentication tokens, and/or connection path information may be stored in memory (260).

The printer (215) includes communication hardware (280, 285, 290), a processor (270), a memory (275) and printer hardware (290). Similar to the computing device, the communication hardware (280, 285, 290) in the printer (215) supports a variety of wireless or wired connections that enable network, peer-to-peer, and/or cloud connectivity. The processor (370) performs a variety of operations including control of various aspects of the printer hardware (390) operation, accessing the memory (375), processing information received from the communication hardware (380, 385, 390), reporting the printer status and settings, and other operations.

The memory (375) may store a variety of data including images to be printed, formatting information and communication data.

Various modules and/or components illustrated in FIG. 2 may he implemented as a computer-readable storage medium containing instructions executed by a processor (245) and stored in memory (260) for performing the operations and functions discussed herein.

Figure 3:
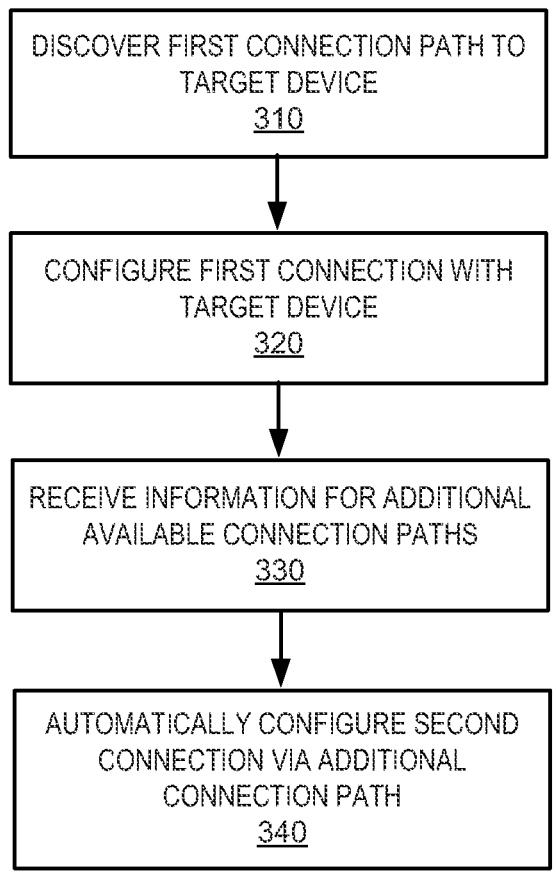
FIG. 3 is a flow diagram of operation according to various embodiments.

FIG. 3 is a flow diagram of operation in a system according to various embodiments. FIG. 3 includes particular operations and execution order according to certain embodiments. However, in different embodiments, other operations, omitting one or more of the depicted operations, and/or proceeding in other orders of execution may also be used according to teachings described herein.

A connecting computing device discovers (310) a first connection path to a target device (e.g., a printer). Discovery may be performed by a discovery application (e.g., using active or passive scanning to obtain the SSID of a wireless LAN), discovery protocol (e.g., multicast DNS (Domain Name System), Bonjour, etc.) or other suitable discovery mechanism.

Having discovered a connection path to the target device, the connecting device configures (320) a connection with the target device. Depending on the connection path, the initial connection may require user input (e.g., network password, key, etc.). Once the connection has been made with the target device, the connecting device receives (330), from the target device via the configured connection path, information for additional available connection paths between the connecting device and the target device. Based on the information for additional available connection paths, the connecting device automatically configures (340) one or more additional connections with the target device. In other words, once the initial connection has been established with the target device (potentially assisted by user input), additional connection configurations are transparent to the user (i.e., connections are created without user input).

Figure 4:
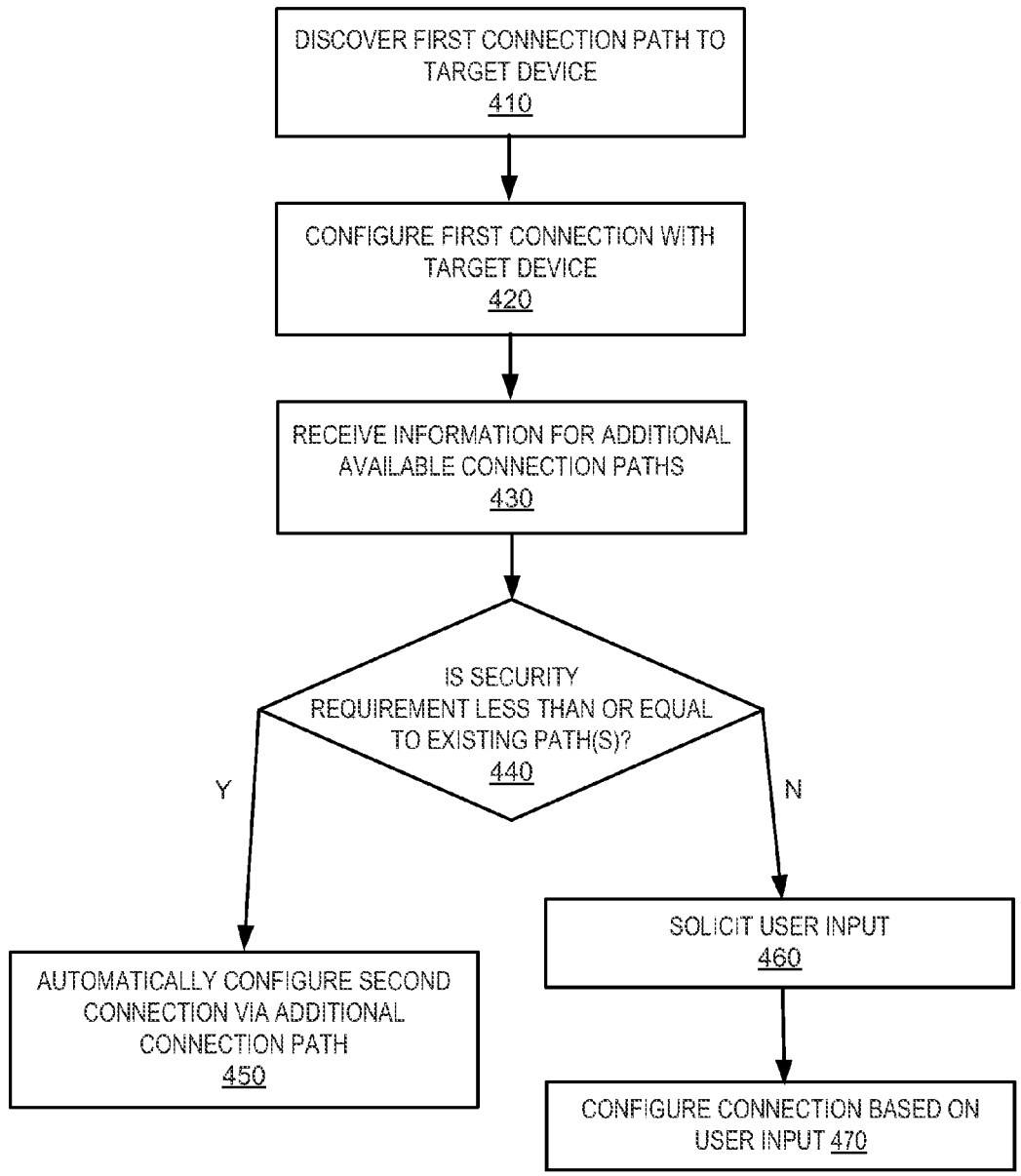
FIG. 4 is a flow diagram of operation according to various embodiments.

FIG. 4 is a flow diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

A connecting computing device discovers (410) a first connection path to a target device (e.g., a printer). Discovery may be performed by a discovery application (e.g., using active or passive scanning to obtain the SSID of a wireless LAN), discovery protocol (e.g., multicast DNS (Domain Name System), Bonjour, etc.) or other suitable discovery mechanism. As part of the discovery process, the connecting device may obtain a target device identifier, an authentication token for the target device, and connection path information, as needed.

Having discovered a connection path to the target device, the connecting device configures (420) a connection with the target device using the device identifier, authentication token, and, where relevant, any connection path information (e.g., URL, IP address, etc.). Depending on the connection path, the initial connection may require user input (e.g., network password, key, etc.). In an example where the target device is a printer capable of receiving print requests via email, the connecting device can connect to the printer without installing a device specific driver. Accordingly, a user might initially connect to the target device via a wireless network (e.g., having a wireless access point), which may have a security requirement requiring the user to provide a network password or key to access the network.

Once the connection has been made with the target device, the connecting device receives (430), from the target device via the established connection path, information for additional available connection paths between the connecting device and the target device. The additional information may be queried by the connecting device or it may be automatically pushed by the target device in response to receiving the initial connection request. The additional information might include a printer address (e.g., IP address), an email address for the printer, etc. It should be noted that multiple cloud connection paths might be available and thus the additional information might include, for example, multiple URLs, each for a different cloud connection path.

Based on the information for additional available connection paths, the connecting device determines (440) for each additional connection path whether the connection path has a security requirement that is less than or equal to the security requirement of the existing connection. If the security requirement of an additional connection path is less than or equal to that of the initial connection, the connecting device automatically configures (450) the additional connection with the target device via the additional connection path. So, for example, if the initial connection was made via a wireless network path, a direct Wi-Fi connection could be established automatically based on having received the SSID of the printer. Or, in another example, a cloud connection could be configured automatically based on having received the IP address or URL of the printer. In other words, once the initial connection has been established with the target device (potentially assisted by user input), additional connection configurations are transparent to the user (i.e., connections are created without user input).

If the security requirement of an additional connection is greater than that of the initial connection, the connecting device solicits (460) user input to satisfy the security requirement. For example, the user might know the URL of the printer and initially configure a cloud connection with the printer. Upon discovering that a wireless network path is available based on information received from the printer, the connecting device requests the network password or key from the user. The connecting device then proceeds to configure (470) the additional connection based on the user input.

Various modifications may be made to the disclosed embodiments and implementations of the invention without departing from their scope. Therefore, the illustrations and examples herein should be construed in an illustrative, and not a restrictive sense.

What is claimed is:

1. A method, comprising:
   a connecting device discovering a first connection path to a target device, the first connection path comprising a first type of communication channel and a first security requirement;
   configuring a first connection with the target device via the first connection path;
   receiving information for an additional available connection path from the target device via the first connection path, the additional available connection path comprising a different second type of communication channel and a second security requirement; and
   configuring a second connection with the target device via the additional available connection path, the first and second security requirements determining whether the second connection is configured automatically or responsive to user input.

2. The method of claim 1, wherein configuring a connection with the target device via a connection path comprises:
   providing a target device identifier and authentication token to the target device via a routing mechanism specified for the connection path.

3. The method of claim 1, wherein discovering a first connection path comprises autodiscovering a wireless access point path, a peer-to-peer wireless path, or a cloud path to the target device.

4. The method of claim 3, wherein the first connection path is a first cloud path and wherein the second connection is configured via a second cloud path.

5. The method of claim 1, wherein at least one of the additional available connection paths includes a connection path of equal or less security than that of the first connection path, and wherein the configuring of the second connection occurs automatically.

6. The method of claim 1, wherein at least one of the additional available connection paths includes a connection path of greater security than that of the first connection path, and wherein the configuring of the second connection occurs in response to input received from a user.

7. The method of claim 1, wherein receiving information for additional available connection paths comprises receiving information for additional available connection paths from the target device via the first connection path in response to sending a query for the information.

8. The method of claim 1, wherein the type of communication channel for one of the connection paths is a wired channel and the type of communication channel for another of the connection paths is a wireless channel.

9. The method of claim 1, wherein the type of communication channel for one of the connection paths is a wireless channel of a first wireless technology, and the type of communication channel for another of the connection paths is a wireless channel of a second wireless technology different from the first technology.

10. The method of claim 1, wherein the first connection path and the additional available connection paths connect a same computing device to the target device.

11. A system, comprising:
    a discovery module to discover a first connection path to a printer, the first connection path comprising a first type of communication channel and a first security requirement;
    a connection module to establish a first connection with the printer via the first connection path;
    a communication module to receive information for additional available connection paths from the printer via the first connection path, at least one of the additional available connection paths comprising a different second type of communication channel and a second security requirement; and
    the connection module further to establish at least a second connection with the printer via an additional available connection path, the first and second security requirements determining whether the second connection is a connection of equal or lesser security than the first connection that is automatically configured, or a connection of greater security than the first connection that is configured responsive to user input.

12. The system of claim 11, further comprising:
    a memory to store a printer identifier and authentication token to access the printer.

13. The system of claim 12, the memory further to store connection path information associated with the connection path for each connection with the printer.

14. The system of claim 11, wherein the first connection path is a first cloud path and wherein the second connection is established via a second cloud path.

15. The system of claim 11, wherein the type of communication channel for one of the connection paths is a wired channel and the type of communication channel for another of the connection paths is a wireless channel.

16. The system of claim 11, wherein the type of communication channel for one of the connection paths is a wireless channel of a first wireless technology, and the type of communication channel for another of the connection paths is a wireless channel of a second wireless technology different from the first technology.

17. A non-transitory computer-readable storage medium containing instructions that, when executed, cause a computer to:
    autodiscover a first connection path to a printer, the first connection path comprising a first type of communication channel and a first security requirement;
    create a first connection with the printer via the first connection path;
    receive information for additional available connection paths from the printer via the first connection path, at least one of the additional available connection paths comprising a different second type of communication channel and a second security requirement; and
    create at least a second connection with the printer via an additional available connection path, the first and second security requirements determining whether the second connection is a connection of equal or lesser security than the first connection that is automatically configured, or a connection of greater security than the first connection that is configured responsive to user input.

18. The computer-readable storage medium of claim 17, comprising further instructions that cause the computer to:
    store a printer identifier and authentication token to access the printer.

19. The computer-readable storage medium of claim 18, comprising further instructions that cause the computer to:
    store routing protocol information for each printer connection.

20. The computer-readable storage medium of claim 17, comprising further instructions that cause the computer to offer a selection of either the first connection or the second connection in response to a user selecting the printer for a print job.

* * * * *